United States Patent [19]

Rieck

[11] 4,374,818

[45] Feb. 22, 1983

[54] PROCESS FOR THE PREPARATION OF ALKALI METAL SALTS OF IMIDODISULFONIC ACID

[75] Inventor: Hans-Peter Rieck, Kelkheim, Fed. Rep. of Germany

[73] Assignee: Hoechst Aktiengesellschaft, Frankfurt am Main, Fed. Rep. of Germany

[21] Appl. No.: 311,273

[22] Filed: Oct. 14, 1981

[30] Foreign Application Priority Data

Oct. 16, 1980 [DE] Fed. Rep. of Germany ....... 3039021

[51] Int. Cl.³ .......................................... C01B 21/093
[52] U.S. Cl. .................................................... 423/388
[58] Field of Search ........................................ 423/388

[56] References Cited

U.S. PATENT DOCUMENTS 2,656,252 10/1953 Marsh ................................. 423/388

FOREIGN PATENT DOCUMENTS

| 646300 | 4/1964 | Belgium | 423/388 |
| 46-6495 | 2/1971 | Japan | 423/388 |
| 48-5439 | 2/1973 | Japan | 423/388 |
| 50-83297 | 5/1975 | Japan . | |
| 647316 | 12/1950 | United Kingdom | 423/388 |
| 676956 | 8/1952 | United Kingdom | 423/388 |

Primary Examiner—O. R. Vertiz
Assistant Examiner—Wayne A. Langel
Attorney, Agent, or Firm—Berman, Aisenberg & Platt

[57] ABSTRACT

Ammonium nitrilotrisulfonate can be hydrolyzed, in a solid form or dissolved form, with alkali metal hydroxide to give alkali metal salts of imidodisulfonic acid or a mixture of alkali metal salts of imidodisulfonic acid and nitrilotrisulfonic acid, amidosulfonic acid and sulfuric acid. Ammonium nitrilotrisulfonate is preferably added to an aqueous solution of an alkali metal hydroxide, which contains at least 3 moles of alkali metal hydroxide per mole of ammonium nitrilotrisulfonate to be added.

13 Claims, 1 Drawing Figure

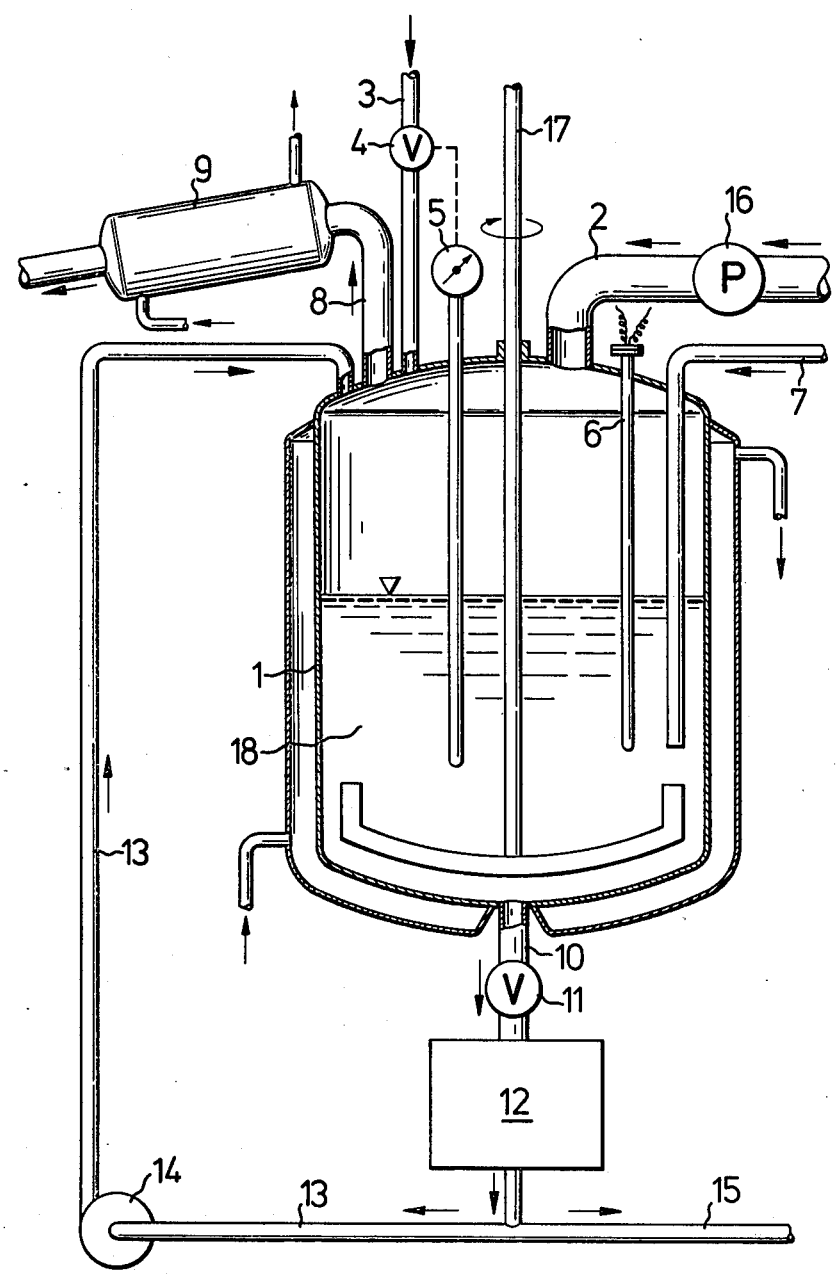

PROCESS FOR THE PREPARATION OF ALKALI METAL SALTS OF IMIDODISULFONIC ACID

The present invention relates to a process for the preparation of alkali metal salts of imidodisulfonic acid or a mixture of alkali metal salts of imidodisulfonic acid and nitrilotrisulfonic acid, and also, in some cases, amidosulfonic acid and sulfuric acid, by reacting ammonium nitrilotrisulfonate with alkali metal hydroxides.

Alkali metal salts of nitrilotrisulfonic acid and imidodisulfonic acid are suitable as builders in detergents (Japanese Preliminary Published Application No. 77-52,904, Japanese Preliminary Published Application No. 77-72,709, German Offenlegungsschrift No. 2,545,611 and German Offenlegungsschrift No. 2,665,181). Sodium salts are here of particular importance.

The preparation of sodium nitrilotrisulfonate by reacting sodium bisulfite with nitrous gases in prior art. However, because of its high solubility the product can be separated from sulfite only with difficulty; furthermore, the yields are low. Japanese Preliminary Published Application No. 75-83,297 indicates that sodium nitrilotrisulfonate can also be prepared by adding a calculated excess of sodium hydroxide to ammonium nitrilotrisulfonate. According to the single illustrative example, a four-fold molar amount of NaOH is added to an aqueous solution of ammonium nitrilotrisulfonate. Ammonia is completely removed by evaporating the mixture at 60° C. under reduced pressure and an alkaline solution of sodium nitrilotrisulfonate is obtained.

The sodium salt of imidodisulfonic acid can be prepared by reacting a sodium nitrite and sodium carbonate solution with $SO_2$ (J.Chem.Soc. 1892, 954) or by reacting sodium bisulfite with nitrous gases (Japanese Preliminary Published Application No. 77-48,593). However, as is the case in the analogous preparation of sodium nitrilotrisulfonate, the yield is low and isolation of the product is difficult. Japanese Preliminary Published Application No. 75-87,981 and also Nippon Kagaku Kaishi 1975, 1160, disclose that the sodium salts or potassium salts of imidodisulfonic acid are obtained by reacting the ammonium salt of imidodisulfonic acid with a solution of sodium hydroxide or potassium hydroxide, respectively.

Since ammonium nitrilotrisulfonate is sparingly soluble, it can be prepared more readily and in a purer form than the corresponding sodium compound. In other respects ammonium salts are less suitable as additives in alkaline detergents because ammonia is split off during the washing process.

The object was therefore to provide an improved process for the preparation of alkali metal salts of imidosulfonic acid, using ammonium nitrilosulfonate as a starting material.

A process has now been found for the preparation of alkali metal salts of imidodisulfonic acid or a mixture of alkali metal salts of imidodisulfonic acid and of nitrilotrisulfonic acid and, in some cases, amidosulfonic acid and sulfuric acid, from ammonium nitrilotrisulfonate, which comprises reacting ammonium nitrilotrisulfonate, in a solid form or in a dissolved form, in the presence of an alkali metal hydroxide. An alkali metal nitrilotrisulfonate is as suitable as a builder in detergents, as is an alkali metal imidodisulfonate. Alkali metal salts of amidosulfonic acid and of sulfuric acid represent impurities, but the latter are not troublesome in detergents. Their presence essentially depends on the conditions under which the reaction mixture is worked up.

A preferred variant of the process according to the invention comprises adding ammonium nitrilotrisulfonate, in a solid form or in a dissolved form, to an aqueous solution of an alkali metal hydroxide, which contains at least 3 moles of alkali metal hydroxide per mole of ammonium nitrilotrisulfonate to be added. Under alkaline conditions, hydrolysis of the trisulfonate to imidodisulfonate is considerably slower than in the presence of an acid. Autocatalytic acceleration of the decomposition of nitrilotrisulfonate by liberated hydrogen ions is therefore also precluded in this variant.

At low temperatures and/or short reaction times (a few minutes) significant amounts of alkali metal nitrilotrisulfonate, which are formed according to the following equation (where M denotes an alkali metal), can still be detected in the reaction product.

$$N(SO_3NH_4)_3 + 3\ MOH = N(SO_3M)_3 + 3\ NH_3 + 3\ H_2O$$

Furthermore, the sulfur-nitrogen bond can also be hydrolyzed, according to the following equation $$N(SO_3M)_3 + 2\ MOH = MN(SO_3M)_2 + M_2SO_4 + H_2O$$

This hydrolysis proceeds to virtual completion at an elevated reaction temperature (above 50° C., even more rapidly above 70° C.), and/or during an extended reaction time. If the hydrolysis is allowed to continue according to the equation $$MN(SO_3M)_2 + H_2O = NH_2SO_3M + M_2SO_4$$

sulfamate results which is worthless as a builder. However, by keeping reaction times short this secondary reaction can be largely prevented.

The converse order of addition, that is to say adding an alkali metal hydroxide solution to a solution or a suspension of ammonium nitrilotrisulfonate, is not preferred, since the reaction can easily go out of control.

Ammonium nitrilotrisulfonate can be used in a pure form or as a crude product which is contaminated by other ammonium salts, for example ammonium imidodisulfonate, ammonium bisulfate and ammonium sulfite (crude product from the preparation of nitrilotrisulfonate from nitrite and ammonium sulfite). Ammonium nitrilotrisulfonate can be used in an anhydrous form, as a moist solid or as an aqueous solution, the latter having to be buffered with ammonia in order to avoid a rapid drop in the pH value and hence a rapid hydrolysis. This aqueous solution is therefore as a rule not prepared from solid ammonium nitrilotrisulfonate. However, aqueous mother liquors from the preparation of ammonium nitrilotrisulfonate can be worked up by this method.

A preferable starting material is a trisulfonate which can be obtained according to German Patent Specification No. 1,767,201 readily and in high yields by reacting a sulfite solution containing ammonia with nitrous gases. A proportion of sulfite in the starting material can be converted into sulfate by oxidation, for example with hydrogen peroxide or with peroxodisulfate. This reaction can take place before, during or after the reaction with an alkali metal hydroxide, according to the invention.

The concentration at which the alkali metal hydroxide is used is not critical. A concentration as high as possible is preferable, so that high proportions of solid reaction products are obtained directly. The reaction can also be carried out in the presence of an organic solvent (example: lower alcohols or acetone) which is miscible with water in all proportions, whereby the solubility of alkali metal salts in water is reduced. The ammonium nitrilotrisulfonate can be added all at once to the solution of the alkali metal hydroxide; however, the addition of small portions at a uniform rate is preferable.

The choice of a reaction temperature is guided by the desired product composition and the average residence time of the product. The lower temperature limit for the reaction is fixed by the freezing point of the alkali metal hydroxide solution; the upper limit is given by the boiling point of the reaction mixture. Preferable temperatures are from 20 to 120, in particular 40° to 100° C. Depending on the type of addition of the reactants, the desired reaction temperature is maintained by heating or cooling.

At temperatures of about 85° to 100° C. the reaction takes place spontaneously after the ammonium nitrilotrisulfonate has dissolved in the reaction mixture, and reaction times of only a few seconds are required in the case of a finely divided solid. In order to achieve completion, it is however preferable to continue reaction for a few minutes up to 2 hours after the sulfonate has dissolved. Still longer reaction times are neither necessary nor desirable. Since the proportion of sulfamate also increases as the duration increases.

At temperatures below 85° C. the reaction times required are only a little longer. Only at temperatures below 40° C. should the reaction period be at least 10 minutes and the pH value be higher than 10.

The process according to the invention can be carried out not only discontinuously but also continuously. In the case of a continuous method an alkali metal hydroxide, preferably in the form of a concentrated solution, and nitrilotrisulfonate are passed into the reactor at the same time and at the same rate. The ratio of the reactants can be controlled via the pH value. If a stirred vessel is chosen as a reactor, a suspension of an alkali metal nitrilotrisulfonate and an alkali metal imidodisulfonate can be the result.

If the pH value of the aqueous phase is maintained above 10 during the hydrolysis, a salt of the form MN(SO$_3$M)$_2$ is precipitated. At pH values between 10 and 7 an increasing amount of a neutral salt HN(SO$_3$M)$_2$ is formed.

The addition of the ammonium salt to an already introduced amount of an alkali metal hydroxide must be discontinued at the latest when the pH value has dropped to 7.

During the reaction ammonia formed can be removed under normal pressure or in vacuo with or without blowing it out by means of an inert gas or by distilling off the solvent. Residual amounts of ammonia are removed on working up the product and drying it. The ammonia can be used again for the preparation of ammoniun nitrilosulfonate.

The isolation of the final product is most readily carried out by separating off the solid phase from the supernatant solution, in particular after cooling down the reaction mixture, for example by filtering or centrifuging it. The product is then dried, if appropriate after washing it. The separated-off liquid phase or the reaction mixture can also be evaporated, in particular by spray-drying. In this case, prior to the spray-drying the liquid phase can be mixed with solutions or suspensions of other substances, which are customary components of detergents (for example: sodium carbonate, sodium silicate, or sodium polyphosphate). These substances which have an alkaline reaction at the same time prevent an acid reaction of the solid due to hydrolysis during the drying process and its subsequent autocatalytic decomposition. A solvent which is miscible with water in all proportions can also be added to the reaction mixture and alkali metal salts thus precipitated. In principle the mother liquor can be used again as a solvent for a new batch or worked up to give ammonium sulfate.

After drying, the resulting product mixture can contain such impurities as alkali metal salts of sulfuric acid and of amidosulfonic acid. These impurities can be largely removed by recrystallization. However, in general purification is not necessary and the salt can be used directly as a builder in detergents.

A further variant of the process according to the invention comprises adding ammonium nitrilotrisulfonate, in a solid form or a dissolved form, to an aqueous solution, which has a pH value of 0 to 7, and, after the desired degree of hydrolysis has been achieved, adding an alkali metal hydroxide to the reaction mixture, until the pH value is 7 to 11. In this variant products are now obtained which contain hardly any nitrilotrisulfonate any longer but mainly imidodisulfonate. Here likewise the trisodium salt of imidodisulfonic acid can be obtained, if the pH value of the second step is above 10. This variant can be represented by the following equations:

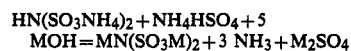

In order to avoid further hydrolysis of the imidodisulfonate to sulfamate, according to the equation

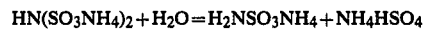

the pH value, temperature and the residence time need to be controlled, because high temperatures, a low pH value and long reactions times favour the formation of sulfamate. In the first step temperatures below 75° C. and pH values between 2 and 6 are preferable. At pH values between 5 and 7 and temperatures of about 50° C. acidic hydrolysis requires some hours, but at pH values below 3 only a few seconds. Working-up the batch can be carried out as in the first variant.

The invention is explained in more detail in the following examples.

DESCRIPTION OF THE EXPERIMENTS

The apparatus used is depicted in the FIGURE.

It is essentially composed of a double-walled vessel (1) with a stirrer (17), into which at the start of the reaction a little concentrated alkali metal hydroxide solution is introduced. The addition of ammonium nitrilotrisulfonate is effected via pipe connection (2). Metering is carried out in the case of dry solid with the aid of a screw and in the case of a moist pasty solid or a solution with the aid of pump (16). A hydroxide solution is added via line (3) and metered with the aid of valve (4). For a pre-determined rate of addition of ammonium nitrilotrisulfonate, the hydroxide solution is added at a rate such that the pH value of the solution is 11 to 12. The pH-measuring instrument (5) controls valve (4). The temperature of the reaction mixture is maintained at about 90°–100° C. by external heating; the temperature is checked with a thermometer (6). Nitrogen is blown into the reaction mixture via line (7), and ammonia, nitrogen and steam pass out via line (8). Steam condenses in a cooler (9).

After the vessel has been filled to a pre-determined level and the reaction mixture (18) has become a pasty substance, part of the reaction mixture (18) is continuously removed via line (10) and valve (11). Solid material is separated off from the suspension, as far as possible directly without intermediate cooling, with the aid of a suction filter or a centrifuge (12) and thereafter dried. A part of the mother liquor is passed back into the reaction vessel via line (13) and pump (14). The remaining part drains away via line (15).

EXAMPLE 1

The double-walled stirred vessel has a capacity of 6 l. At the start of the reaction 1 l of 50% strength sodium hydroxide solution is introduced into the reaction vessel and is warmed with stirring to 70°–100° C. by external heating. This temperature is maintained for the whole duration of the experiment. Nitrogen is blown into the vessel at a rate of about 100 l/h. Approximately 2 kg of pasty ammonium nitrilotrisulfonate (approximately 10–15% of water; content in the dry solid approximately 80–90%) and, simultaneously, approximately 2 kg/h of 50% strength sodium hydroxide solution are added per hour. During the whole experiment the pH value is between 10 and 12. Steam and ammonia are driven off and after the condensation, a concentrated ammonia solution ($\delta = 0.924 - 0.962$ g/cm$^3$) and gaseous ammonia are obtained. In the stirred vessel the initially clear solution gradually becomes a suspension. The heating, the addition of educts and discharging of the product mixture are controlled in such a manner that the reaction mixture is a readily stirrable paste. This is continuously removed, filtered and dried. In the course of 32 hours, 69.5 kg of the dried sodium salt are obtained from 70.9 kg of the moist amonium salt of nitrilotrisulfonic acid and 76.4 kg of 50% strength sodium hydroxide solution. The composition of the contaminated product is determined by X-ray diagrams, by a titration with a sodium nitrite solution, sulfuric acid and a sodium hydroxide solution and also by a sulfate precipitation. According to these methods, the product contains 40% of NaN(SO$_3$Na)$_2$, 5% of H$_2$NSO$_3$Na, 2% of N(SO$_3$Na)$_3$ and 50% of Na$_2$SO$_4$. A 10% strenbth aqueous solution of the product has a pH value of 9.75.

EXAMPLE 2

The double-walled stirring vessel has a capacity of 1 l. 30 ml of a sodium hydroxide solution (50% strength) are introduced into it. In the course of 30 minutes 200 g of ammonium nitrilotrisulfonate (content 80–90%, the remainder is further ammonium salts) are reacted with 165 ml of NaOH (50% strength) at 80° C. and pH 10.5–11.5. The crude product is then dried in vacuo at 80° C. 235.4 g are obtained: 6% of n(SO$_3$Na)$_3$, 40% of NaN(SO$_3$Na)$_2$, and 9% of H$_2$NSO$_3$Na. A 10% strength solution has a pH value of 12.0.

EXAMPLE 3

200 g of ammonium nitrilotrisulfonate are reacted with 140 ml of a sodium hydroxide solution (50% strength) at 35°–57° C. and pH 9–11, as described in Example 2. The crude product is then dried in vacuo at 40° C. 227.4 g of product are obtained: 8% of N(SO$_3$Na)$_3$, 36% of NaN(SO$_3$Na)$_2$, and 9% of H$_2$NSO$_3$Na. A 10% strength aqueous solution has a pH value of 8.05.

EXAMPLE 4

400 g of ammonium nitrilotrisulfonate are reacted with 385 ml of 50% strength potassium hydroxide solution at 18° to 31° C. and pH 11.0–11.5 in the course of 35 minutes, as described in Example 2. The crude product is then dried in vacuo at 70° C. 412.5 g of a dried product are obtained: 39% of N(SO$_3$K)$_3$, 44% of KN(SO$_3$K)$_2$ and 2% of H$_2$NSO$_3$K.

EXAMPLE 5

650 g of ammonium nitrilotrisulfonate and 500 g of a sodium hydroxide solution (50% strength by weight) are added to a little water, the addition being controlled in such a manner that the pH value is always 2–3. The temperature is 50°–55° C. The pH of the reaction mixture is then raised to 11.3 by adding 258.5 g of a sodium hydroxide solution (50% strength). The crude product is allowed to cool and the solid material is filtered off and dried. Its composition is: 0% of N(SO$_3$Na)$_3$, 34% of NaN(SO$_3$Na)$_2$ and 6% of H$_2$NSO$_3$Na.

I claim:

1. A process for obtaining an alkali metal salt of imidodisulfonic acid which comprises hydrolyzing ammonium nitrilotrisulfonate in the presence of an alkali metal hydroxide.

2. A process according to claim 1 wherein the employed ammonium nitrilotrisulfonate is in solid or substantially-solid form.

3. A process according to claim 1 wherein the employed ammonium nitrilotrisulfonate is in a dissolved form.

4. A process according to claim 2 which comprises recovering imidodisulfonic acid alkali-metal salt or a mixture of alkali-metal salt of imidodisulfonic acid and of nitrilotrisulfonic acid, imidosulfonic acid and sulfuric acid.

5. A process according to claim 2 which comprises adding ammonium nitrilotrisulfonate to an aqueous solution of an alkali-metal hydroxide which contains at least 3 moles of alkali-metal hydroxide per mole of ammonium nitrilotrisulfonate and subsequently hydrolyzing the nitrilotrisulfonate.

6. A process according to claim 5 which comprises isolating the hydrolysis product in solid alkali-metal-salt form after effecting a desired degree of hydrolysis.

7. A process for obtaining an alkali metal salt of imidodisulfonic acid which comprises adding ammonium nitrilotrisulfonate to an aqueous solution having a pH of from 0 to 7, effecting a desired degree of hydrolysis and then adding to the resulting reaction mixture an amount of alkali-metal hydroxide sufficient to increase the pH value to from 7 to 11.

8. A process according to claim 7 which further comprises isolating thus obtained alkali-metal salts in solid form.

9. A process according to claim 3 which comrises recovering imidodisulfonic acid alkali-metal salt or a mixture of alkali-metal salt of imidodisulfonic acid and of nitrilotrisulfonic acid, imidosulfonic acid and sulfuric acid.

10. A process according to claim 9, claim 4, claim 6 or claim 8 which further comprises drying recovered solid alkali-metal salts.

11. A process according to claim 5 or claim 7 which comprises evaporating liquid from the reaction mixture.

12. A process according to claim 11 which comprises spray-drying liquid from the reaction mixture.

13. A process according to claim 5 or claim 7 which comprises adding an organic solvent which is readily miscible with water to the liquid reaction mixture or to the liquid phase of the reaction mixture from which solid alkali-metal salts have been removed and then separating thus-precipitated alkali-metal salts from the resulting liquid phase.

* * * * *